(12) United States Patent
Kinane

(10) Patent No.: US 6,568,705 B2
(45) Date of Patent: May 27, 2003

(54) SEAMLESS DOOR SYSTEM FOR AN AIRBAG

(75) Inventor: Jeffrey A. Kinane, Birmingham, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/054,312

(22) Filed: Oct. 29, 2001

(65) Prior Publication Data

US 2003/0080540 A1 May 1, 2003

(51) Int. Cl.$^7$ ............................................... B60R 21/20
(52) U.S. Cl. ..................................... 280/728.3; 280/732
(58) Field of Search ........................... 280/728.3, 732, 280/728.2, 730.1, 752

(56) References Cited

U.S. PATENT DOCUMENTS

| 5,393,088 A | 2/1995 | Bauer et al. |
| 5,393,089 A | 2/1995 | Pakulsky et al. |
| 5,456,487 A | 10/1995 | Daris et al. |
| 5,498,027 A | 3/1996 | Kelley et al. |
| 5,810,388 A | 9/1998 | Berardi et al. |
| 5,997,030 A | 12/1999 | Hannert et al. |
| 6,076,851 A | 6/2000 | Davis, Jr. et al. |
| 6,092,835 A | 7/2000 | Thakore et al. |
| 6,145,871 A | 11/2000 | Davis, Jr. et al. |
| 6,318,752 B1 * | 11/2001 | Warnecke et al. ....... 280/728.3 |
| 2002/0005630 A1 * | 1/2002 | Suzuki et al. ............ 280/728.3 |
| 2002/0008368 A1 * | 1/2002 | Kurimoto ................ 280/728.2 |

FOREIGN PATENT DOCUMENTS

| JP | 5-185896 | * 7/1993 | .................. 280/752 |
| JP | 10-44910 | * 2/1998 | |

* cited by examiner

*Primary Examiner*—Peter C. English
(74) *Attorney, Agent, or Firm*—Brinks Hofer Gilson & Lione

(57) ABSTRACT

An instrument panel for an automobile passenger compartment comprises a substrate with a pre-weakened outline formed therein defining a panel door. A chute is mounted to the substrate and a support door with a hinge portion and a door portion is mounted to the chute. The hinge portion is attached to the chute and the door portion is pivotally attached to the hinge portion. The door portion is further attached to the panel door by a plastic inner door panel that is vibration welded to the panel door through apertures within the door portion of the support door.

11 Claims, 2 Drawing Sheets

SEAMLESS DOOR SYSTEM FOR AN AIRBAG

TECHNICAL FIELD OF THE INVENTION

The patent discloses and claims a useful, novel, and unobvious invention for an automobile instrument panel, including an air bag device and a seamless outer cover.

BACKGROUND

One issue that has recently been a concern with air bag devices installed in automobile is that the air bag must preserve the aesthetic appeal of the automobile, but at the same time, deploy outward through the instrument panel with minimal interference. In a hard molded instrument panel, the air bag must be able to break through the instrument panel, but the instrument panel itself must be structurally sound and resistant to inadvertent fracturing at or near the point where the air bag is meant to deploy. For this reason, there is a need in the industry for an improved air bag door in a hard molded instrument panel.

SUMMARY OF THE INVENTION

An instrument panel for an automobile passenger compartment comprises a substrate with a pre-weakened outline formed therein defining a panel door. A chute is mounted to the substrate and a metal door with a hinge portion and a door portion is mounted to the chute. The hinge portion is attached to the chute and the door portion is pivotally attached to the hinge portion. The door portion is further attached to the panel door by a plastic inner door panel that is vibration welded to the panel door through apertures within the door portion of the metal door.

DETAILED DESCRIPTION OF THE PREFERRED EMBODIMENT

The following description of the preferred embodiment of the invention is not intended to limit the scope of the invention to this preferred embodiment, but rather to enable any person skilled in the art to make and use the invention.

Figure 1:
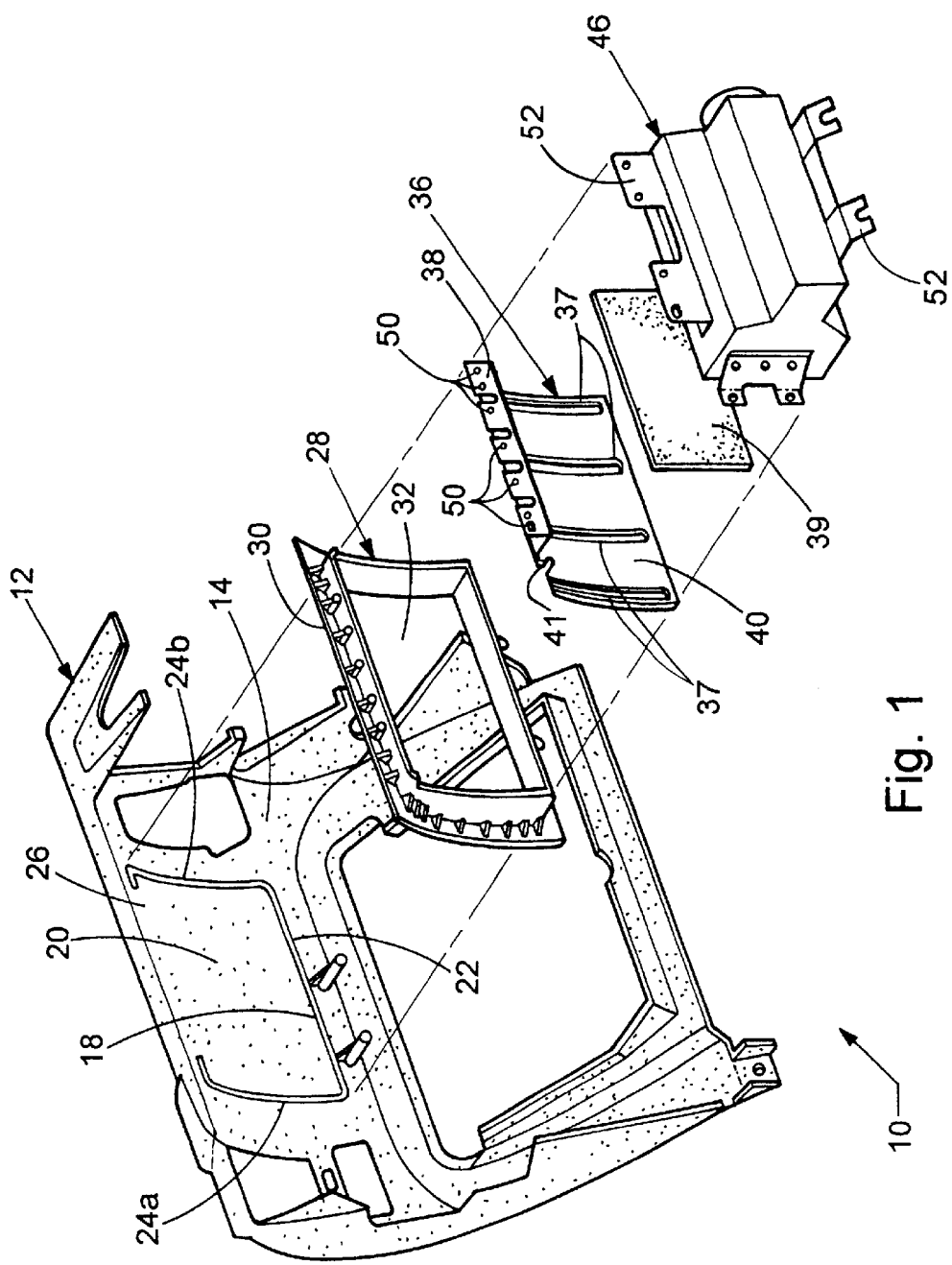
FIG. 1 is an exploded view of an instrument panel of the present invention.
Figure 2:
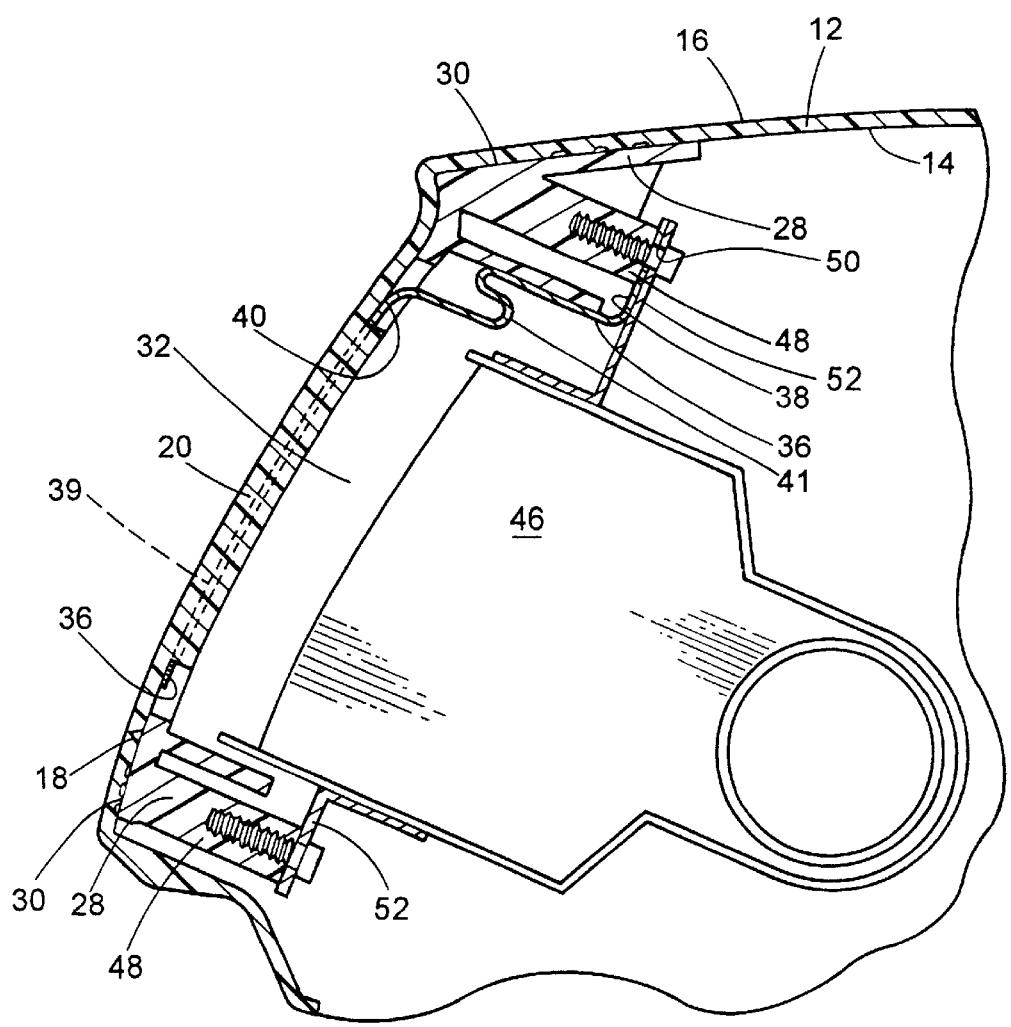
FIG. 2 is a cross-sectional side view of the instrument panel shown in FIG. 1.

Referring to FIGS. 1 and 2, an instrument panel for an automobile passenger compartment is generally shown at 10. The instrument panel includes a substrate 12 including an interior surface 14 and an exterior surface 16. Preferably, the substrate 12 is formed from molded-in-color polypropylene, however it is to be understood that the substrate 12 could comprise other suitable materials. The exterior surface 16 of the substrate 12 faces into the interior of the vehicle, and the interior surface 14 of the substrate 12 faces away from the interior of the vehicle. The exterior surface 16 is molded to the color and texture specifications required by the vehicle to allow the substrate 12 to present a cosmetically acceptable instrument panel 10 to the interior of the vehicle.

The interior surface 14 of the substrate includes a pre-weakened outline 18 formed therein which defines a panel door 20 within the substrate 12. The pre-weakened outline 18 extends in a generally rectangular shape to define the top edge 26, bottom edge 22 and two sides 24a, 24b of the panel door 20. The pre-weakened outline 18 allows the substrate 12 to maintain structural integrity and appearance while providing a weakened outlined that will break away under the pressure of the deploying air bag. When the air bag is deployed, the force is sufficient to break the panel door 20 away from the remaining portion of the substrate 12 along the pre-weakened outline 18.

The pre-weakened outline 18 within the interior surface 14 of the substrate 12 can be formed by many methods, however, in the preferred embodiment, the pre-weakened outline 18 is formed by laser scoring the interior surface 14 of the substrate 12. By appropriately selecting and controlling the laser a cut can be made within the interior surface 14 which extends into the substrate 12. Preferably, the cut is deep enough to weaken the substrate 12, but not deep enough to compromise the structural integrity of the substrate 12 under normal operating conditions. Preferably, the cut does not provide any visible indication on the exterior surface 16 of the substrate 12 that the pre-weakened outline 18 is present.

Alternatively, the pre-weakened outline 18 within the substrate 12 can be formed with a varying depth such that the bottom edge 22 of the panel door 20 is weaker than the sides 24a, 24b and the top edge 26. Correspondingly, the pre-weakened outline 18 along the sides 24a, 24b is weaker than the top edge 26, but stronger than the bottom edge 22. This will allow the bottom edge 22 to break away first upon deployment of the airbag to further control the deployment of the air bag. The panel door 20 will tear free from the remaining substrate 12 first along the bottom edge 22 and then along the sides 24a, 24b and then finally along the top edge 26 in a zipper like fashion.

A chute 28 is mounted to the interior surface 14 of the substrate 12. The chute 28 includes a front surface 30 and an opening 32 extending therethrough. The front surface 30 extends around the opening 32 within the chute 28. The chute 28 can be injection molded from the same molded-in-color polypropylene material as the substrate 12, or alternatively, the chute 28 can be injection molded from a material that is harder than the substrate 12 such as rubber filled polypropylene or glass filled polypropylene. Depending on the application, the chute 28 can be molded from any suitable material. Preferably, the front surface 30 of the chute 28 is vibration welded to the interior surface 14 of the substrate, however, it is to be understood that the chute 28 could be mounted to be interior surface 14 by other appropriate methods.

The instrument panel 10 further includes a support door 36 mounted to the chute 28 and to the panel door 20. The support door 36 includes a hinge portion 38 and a door portion 40. The hinge portion 38 is attached to the chute 28. The door portion 40 is pivotally attached to the hinge portion 38, and further attached to the panel door 20. The support door 36 is adapted to strengthen the panel door 20 and to provide a hinge for the panel door 20. Preferably the support door 36 is made from steel to provide a stiff structure for the panel door 20. The stiffness of the panel door 20 will insure a more efficient transfer of energy through the panel door 20 to the pre-weakened outline 18.

The panel door 20 can be attached to the hinge portion 38 by any pivotal means, however, in the preferred embodiment, the hinge portion 38 and the door portion 40 are formed from a single piece of stamped metal, preferably steel. When the panel door 20 pivots from a closed position to an open position, the single stamped piece of steel bends at a point between the door portion 40 and the hinge portion 38. The single piece stamping includes a contour lip 41 between the door portion 40 and the hinge portion 38 to provide a pre-determined crease line to allow proper pivotal movement of the door portion 40 in relation to the substrate 12. Preferably, the contour lip 41 portion of the support door 36 includes slots (not shown) to weaken the contour lip 41 to allow the support door 36 to bend along the crease line. The size and quantity of the slots within the contour lip 41 are gauged to provide an appropriate amount of resistance when the door portion 40 of the support door 36 is forced open. Preferably, the energy supplied to the panel door 20 and support door 36 during deployment of the air bag is substantially absorbed by the time the panel door 20 and support door 36 are fully opened. In this way, the amount of residual energy left within the panel door 20 and the door portion 40 of the support door 36 is reduced.

The support door 36 includes plurality of apertures 37 extending therethrough. In the preferred embodiment, a plastic inner door panel 39 is mounted to the panel door 20 through and around the support door 36. The plastic inner door panel 39 is vibration welded to the panel door 20 at the locations where the plastic inner door panel 39 contacts the panel door 20 through the apertures 37 within the support door 36 and around the outer perimeter of the door portion 40 of the support door 36. Preferably, the door portion 40 of the support door 36 is sandwiched between and boxed in by the plastic inner door panel 39. This secures the support door 36 to the panel door 20, held between the plastic inner door panel 39 and the panel door 20. This will provide additional structural support for the panel door 20, as well as providing a hinge for the panel door 20.

An air bag module 46 is mounted to the chute 28. The chute 28 includes molded in bosses 48 which are adapted to receive fasteners to secure the air bag module 46 to the chute 28. The hinge portion 38 of the metal door 36 includes apertures 50 adapted to receive fasteners therethrough so that the hinge portion 38 of the metal door 36 is sandwiched between the molded in bosses 48 of the chute 28 and the air bag module 46. Preferably, the air bag module 46 includes a plurality of mounting brackets 52 that are adapted to mount the air bag module to the chute 28. Additionally, the air bag module 46 preferably includes at least one bracket 52 adapted to mount the air bag module 46 to a support structure within the automobile.

The foregoing discussion discloses and describes one preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

I claim:

1. An instrument panel for an automobile passenger compartment comprising:

a substrate including an interior surface and an exterior surface;

a pre-weakened outline formed within said interior surface defining a panel door within said substrate;

a chute mounted to said interior surface and including a front surface and an opening therein, said front surface extending around said opening;

a support door including a hinge portion and a door portion, said hinge portion attached to said chute and said door portion pivotally attached to said hinge portion and attached to said panel door, said door portion of said support door including apertures therethrough; and an inner door panel attached to said panel door, wherein said panel door and said inner door panel are attached through said apertures within said support door, thereby securing said support door therebetween.

2. The instrument panel as set forth in claim 1 further including an air bag module mounted to said chute, said hinge portion of said support door being disposed between said chute and said air bag module.

3. The instrument panel as set forth in claim 2 wherein said chute includes molded in bosses adapted to receive threaded fasteners and to support said support door and said air bag module.

4. The instrument panel as set forth in claim 3 wherein said air bag module includes a plurality of mounting brackets adapted to mount said air bag module to said chute.

5. The instrument panel as set forth in claim 1 wherein said substrate is formed from molded-in-color polypropylene.

6. The instrument panel as set forth in claim 5 wherein said chute is injection molded from the same molded-in-color polypropylene material as said substrate.

7. The instrument panel as set forth in claim 5 wherein said chute is injection molded from a material that is harder than said substrate.

8. The instrument panel as set forth in claim 1 wherein said pre-weakened outline within said interior surface is a laser scored line.

9. The instrument panel as set forth in claim 1 wherein said inner door panel is made from plastic.

10. The instrument panel as set forth in claim 1 wherein said support door is made from steel.

11. The instrument panel as set forth in claim 1 wherein said panel door and said inner door panel are attached to each other by vibration welds where said panel door contacts said inner door panel through said apertures within said support door and around a perimeter of said support door.

* * * * *